No. 793,088. PATENTED JUNE 27, 1905.
W. PARISO.
NUT LOCK.
APPLICATION FILED FEB. 28, 1905.

WITNESSES
Jos J. Hosler
L. M. Bond

INVENTOR
William Pariso.
BY F. W. Bond
ATTORNEY

No. 793,088. Patented June 27, 1905.

UNITED STATES PATENT OFFICE.

WILLIAM PARISO, OF ALLIANCE, OHIO, ASSIGNOR OF ONE-FOURTH TO MATTHEW B. CARTER AND ONE-FOURTH TO JOHN O. STANLEY, OF ALLIANCE, OHIO.

NUT-LOCK.

SPECIFICATION forming part of Letters Patent No. 793,088, dated June 27, 1905.

Application filed February 28, 1905. Serial No. 247,652.

*To all whom it may concern:*

Be it known that I, WILLIAM PARISO, a citizen of the United States, residing at Alliance, in the county of Stark and State of Ohio, have invented certain new and useful Improvements in Nut-Locks; and I do hereby declare that the following is a full, clear, and exact description of the same, reference being had to the annexed drawings, making a part of this specification, in which—

Figure 1:
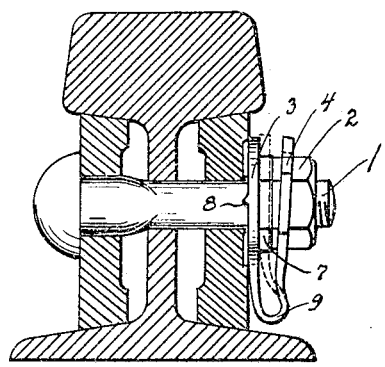
Figure 2:
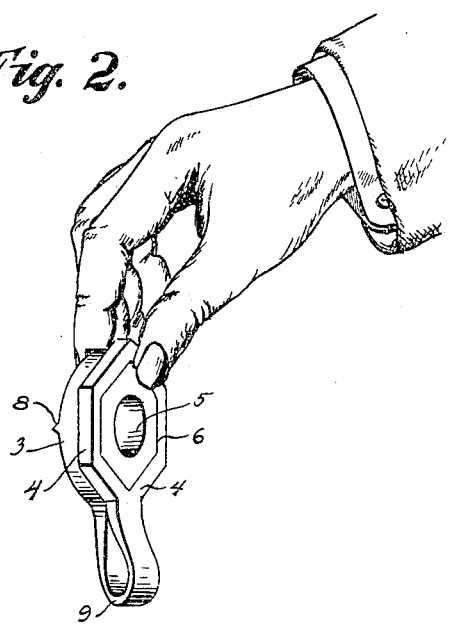
Figure 3:
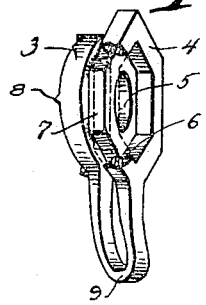

Figure 1 is a view showing transverse section of the parts bolted together and the nut locked. Fig. 2 is a view of the locking device, showing the same brought into position to release the nut. Fig. 3 is a view showing the nut-locking device in its normal position and showing parts broken away.

Similar numerals of reference indicate corresponding parts in all the figures of the drawings.

In the accompanying drawings, 1 represents the bolt, which may be of any desired size, reference being had to the purpose for which it is designed. The bolt 1 is provided with the usual screw-threaded portion, upon which screw-threaded portion is located the nut 2. After the parts designed to be clamped are brought into position and the bolt 1 properly placed to clamp the parts the nut-locking device is applied. The nut-locking device consists of two members 3 and 4, the member 3 being provided with the bolt-hole 5 and the member 4 is provided with the angular aperture 6, which angular aperture is formed of a size and shape to correspond with the size and shape of the nut 2. It will be understood that the angular aperture 6 is to be varied as to size and shape to correspond with the various sizes and shapes of the nuts.

The member 3 of the locking device is provided with the flange 7, which flange is located upon the outer face of the member 3 and is preferably formed of a size and shape to correspond with the size and shape of the nut designed to be locked.

For the purpose of preventing the locking device from rotating when placed in position the inner face of the member 3 is provided with any desired number of points 8, which points abut against the adjacent part to be clamped, and when the nut has been properly tightened the points 8 will be sufficiently embedded or seated to prevent any rotation of the locking device.

The member 4 is connected to the member 3 by the spring extension 9, said spring extension being so tempered that the normal position of the member 4 will be that shown in Figs. 1 and 3, which position brings the member 4 out of a plane with the flange 7, thereby preventing any rotation of the nut after the nut has been turned to clamp the parts designed to be held together.

In use the part 4 is brought into the position illustrated in Fig. 2, which brings the angular aperture 6 over the angular flange 7 and allows the nut to be brought in close contact with the outer face of said flange. After the nut has been properly brought home the member 4 is released and when released it assumes the position illustrated in Figs. 1 and 3, thereby securely locking the nut against rotation.

Having fully described my invention, what I claim as new, and desire to secure by Letters Patent, is—

In a nut-lock, the combination of a bolt and a nut located thereon, a locking device consisting of two members normally spaced from each other, one of said members provided with a bolt-aperture, a series of contact-points and a flange corresponding in size and shape with the nut designed to be locked, and the other member of the locking device provided with a nut-aperture, said member adapted to be located upon the flange when compressed, and engage the nut when released, substantially as and for the purpose specified.

In testimony that I claim the above I have hereunto subscribed my name in the presence of two witnesses.

WILLIAM PARISO.

Witnesses:
JAMES I. RICKARD,
A. E. LINTON.